United States Patent [19]

Lin et al.

[11] Patent Number: 5,315,468

[45] Date of Patent: May 24, 1994

[54] MAGNETORESISTIVE SENSOR HAVING ANTIFERROMAGNETIC LAYER FOR EXCHANGE BIAS

[75] Inventors: Tsann Lin, Campbell; James K. Howard, Morgan Hill; Cherngye Hwang, San Jose; Daniele Mauri, San Jose; Norbert Staud, San Jose, all of Calif.

[73] Assignee: International Business Machines Corporation, Armonk, N.Y.

[21] Appl. No.: 920,943

[22] Filed: Jul. 28, 1992

[51] Int. Cl.$^5$ .................... G11B 5/127; G11B 5/33
[52] U.S. Cl. .................................................. 360/113
[58] Field of Search ............................ 360/113, 110

[56] References Cited

U.S. PATENT DOCUMENTS

| | | | |
|---|---|---|---|
| 4,103,315 | 7/1978 | Hempstead et al. | 360/110 |
| 4,663,685 | 5/1987 | Tsang | 360/113 |
| 4,755,897 | 7/1988 | Howard | 360/113 |
| 4,782,413 | 11/1988 | Howard et al. | 360/113 |
| 4,809,109 | 2/1989 | Howard et al. | 360/113 |
| 5,014,147 | 5/1991 | Parkin et al. | 360/113 |
| 5,079,035 | 1/1992 | Krounbi et al. | 360/113 X |

FOREIGN PATENT DOCUMENTS

0334480A2  2/1989  European Pat. Off. ........ G11B 5/39

OTHER PUBLICATIONS

Tsang, "Magnetics of small magnetoresistive sensors (invited)", J. Appl. Phys., vol. 55, No. 6, Mar. 15, 1984, pp. 2226–2231.

Primary Examiner—John H. Wolff
Attorney, Agent, or Firm—Leslie G. Murray

[57] ABSTRACT

A magnetoresistive (MR) sensor comprising a sputtered layer of ferromagnetic material and a sputtered layer of antiferromagnetic nickel-manganese (Ni-Mn) to provide an exchange coupled longitudinal bias field in the MR element is described. The antiferromagnetic layer overlays the MR layer and may be patterned to provide the longitudinal bias field only in the end regions of the MR layer. Alternatively, the antiferromagnetic layer can underlay the MR layer with a Zr underlayer to enhance the exchange-coupled field. As initially deposited, the Ni-Mn layer is face-centered-cubic and exhibits little or no exchange-coupled field. After one annealing cycle at a relatively low temperature, the Ni-Mn layer is face-centered-tetragonal and exhibits increased crystallographic ordering and provides sufficient exchange coupling for the MR element to operate. Addition of chromium to the Ni-Mn alloy provides increased corrosion resistance.

11 Claims, 8 Drawing Sheets

MAGNETORESISTIVE SENSOR HAVING ANTIFERROMAGNETIC LAYER FOR EXCHANGE BIAS

BACKGROUND OF THE INVENTION

The present invention relates generally to magnetoresistive (MR) read sensors and, more particularly, to an MR read sensor in which an improved antiferromagnetic film provides an exchange-coupled longitudinal bias field in the ferromagnetic MR film of the sensor.

A general description of the principle of operation of MR sensors in magnetic recording systems is provided by Tsang in "Magnetics of Small Magnetoresistive Sensors", *Journal of Applied Physics*, Vol. 55(6), Mar. 15, 1984, pp. 2226–2231. Essentially, an MR sensor detects magnetic field signals through the resistance changes of the magnetoresistive read element as a function of the amount and direction of magnetic flux being sensed by the element. MR sensors are of interest for three primary reasons: the voltage output when detecting recorded flux transitions in a magnetic medium is large and proportional to an applied sense current; good linear density resolution can be obtained; and the MR sensor output is independent of the relative velocity between sensor and medium.

It is well known in the prior art that in order for an MR sensor to operate optimally, two bias fields are required. To bias the MR material so that its response to a magnetic flux field is linear, a transverse bias field is generally provided. This bias field is normal to the plane of the magnetic media and parallel to the surface of the planar MR element. Typically, the transverse bias field is provided by a current flow through a layer of soft magnetic material deposited adjacent to the MR element and separated by a thin electrically insulating layer.

The second bias field which is typically utilized with MR elements is referred to as the longitudinal bias field and extends parallel to the surface of the magnetic media and parallel to the lengthwise direction of the MR element. The primary purpose of the longitudinal bias is to suppress Barkhausen noise which is generated by multi-domain activities within the MR element. A secondary purpose of the longitudinal bias field is to improve the magnetic stability in the presence of high magnetic field excitation. The longitudinal bias field typically is provided by either hard-magnet or exchange-coupling biasing.

The phenomenon of exchange anisotropy is well-known in the art. It occurs as a result of the interaction of a ferromagnetic material in contact with an antiferromagnetic material, and can be described in terms of an exchange interaction between magnetic moments on each side of the interface between the two materials. For example, exchange coupling between thin layers of nickel-iron ($Ni_{81}Fe_{19}$) and iron-manganese ($Fe_{50}Mn_{50}$) produces a unidirectional anisotropy resulting in a shift of the BH loop in the MR element.

Commonly assigned U.S. Pat. No. 4,103,315 to Hempstead et al discloses an MR sensor which utilizes antiferromagnetic-ferromagnetic exchange coupling to provide a uniform longitudinal bias field in the MR element of the sensor. The exchange coupling between the antiferromagnetic and ferromagnetic layers creates a single domain state in the ferromagnetic layer (the MR element) and thereby suppresses the Barkhausen noise associated with domain activity. Hempstead et al teaches an MR sensor in which Ni-Fe serves as the ferromagnetic MR layer and a gamma phase manganese (Mn) alloy with iron (Fe-Mn) having a face-centered-cubic (fcc) structure as the antiferromagnetic layer. Hempstead et al also suggests that alloys of Mn with cobalt (Co), copper (Cu), germanium (Ge), nickel (Ni) and rhodium (Rh) may produce a stable gamma phase Mn alloy when deposited on Ni-Fe.

Commonly assigned U.S. Pat. No. 4,663,685 describes an MR sensor having an Fe-Mn alloy antiferromagnetic layer divided into separate end portions for providing an exchange bias primarily in corresponding end portions of the MR layer.

Two problems encountered with the use of Fe-Mn as the antiferromagnetic layer in MR sensors are its susceptibility to corrosion and the temperature sensitivity of the unidirectional anisotropy field ($H_{UA}$). The material is exposed to corrosive environments both during the thin film fabrication processes and during operation of the MR sensor in a magnetic recording system.

In order to decrease the temperature sensitivity of the $H_{UA}$, the deposited Ni-Fe/Fe-Mn layers have been annealed for 20–50 hours at a temperature ranging from 260 to 350 degrees C. With such an extended annealing process, significant interdiffusion occurs at the interface between the layers causing the formation of a ternary Ni-Fe-Mn film which provides a much greater $H_{UA}$ (up to 48 Oe) at the MR sensor operating temperature of 80 degrees C. and exhibits a blocking temperature, at which the $H_{UA}$ goes to zero, beyond the Neel temperature for bulk Fe-Mn (about 220 degrees C.). The interdiffusion, however, substantially decreases the magnetic moment of the MR sensor. On the other hand, other elements, such as Cr, Ir, Pt, Rh and Ru, for example, have been added to the Fe-Mn alloy layer in order to improve its corrosion resistance. Commonly assigned U.S. Pat. No. 4,755,897 to Howard discloses an improved MR sensor having an antiferromagnetic layer comprising an alloy of Fe, Mn and Cr. In particular, by adding 4.5 at % Cr to a 30 nanometer (nm) thick Fe-Mn film, the corrosion current density ($i_c$) in an aerated 0.1N sodium sulfate electrolyte decreases from 8 to 2 $uA/cm^2$, and further decreases to 0.5 $uA/cm^2$ after annealing the uncoated film in air for one hour at 150 degrees C. However, the addition of the Cr decreases the strength of the $H_{UA}$ to only 16 Oe at room temperature, and further to about zero at 80 degrees C.

SUMMARY OF THE INVENTION

It is therefore a primary object of the present invention to provide a magnetoresistive (MR) read sensor having improved exchange coupling characteristics that are stable during thermal cycling.

It is a further object of the present invention to provide an MR read sensor having an antiferromagnetic layer with improved corrosion characteristics without causing a decrease in the exchange bias field.

It is another object of the present invention to provide an MR read sensor requiring reduced annealing temperatures during fabrication.

In accordance with the principles of the present invention an MR read sensor comprises an antiferromagnetic layer formed in direct contact and overlaying a ferromagnetic MR layer wherein the antiferromagnetic layer is an alloy of Ni and Mn, with at least a portion of the Ni-Mn alloy having a face-centered-tetragonal (fct) structure. The fct Ni-Mn antiferromagnetic layer exhibits significantly improved exchange coupling characteristics and thermal stability over a wide range of temperatures when compared to prior art MR sensors utilizing an Fe-Mn alloy antiferromagnetic layer. The addition of up to 11 at % Cr to the Ni-Mn provides ternary Ni-Mn-Cr alloy films exhibiting significantly improved corrosion characteristics comparable to Ni-Fe and Co-Cr-Pt films without detrimental effect on the exchange coupling properties of the films. A significant advantage is the low annealing temperature required which minimizes interdiffusion and allows a lower-temperature fabrication process.

A second embodiment of the present invention provides an MR read sensor wherein an antiferromagnetic Ni-Mn film with a zirconium underlayer is deposited in direct contact with and under the end regions of the MR layer for longitudinally biasing the MR layer. The resulting configuration for the MR sensor allows the MR layer conductor leads to be deposited directly on the MR layer rather than overlaying the antiferromagnetic layer thus reducing lead resistance and minimizing signal loss and Joule heating due to the electrical resistance of the antiferromagnetic layer.

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like parts and in which.

DETAILED DESCRIPTION OF THE PREFERRED EMBODIMENTS

Figure 1:
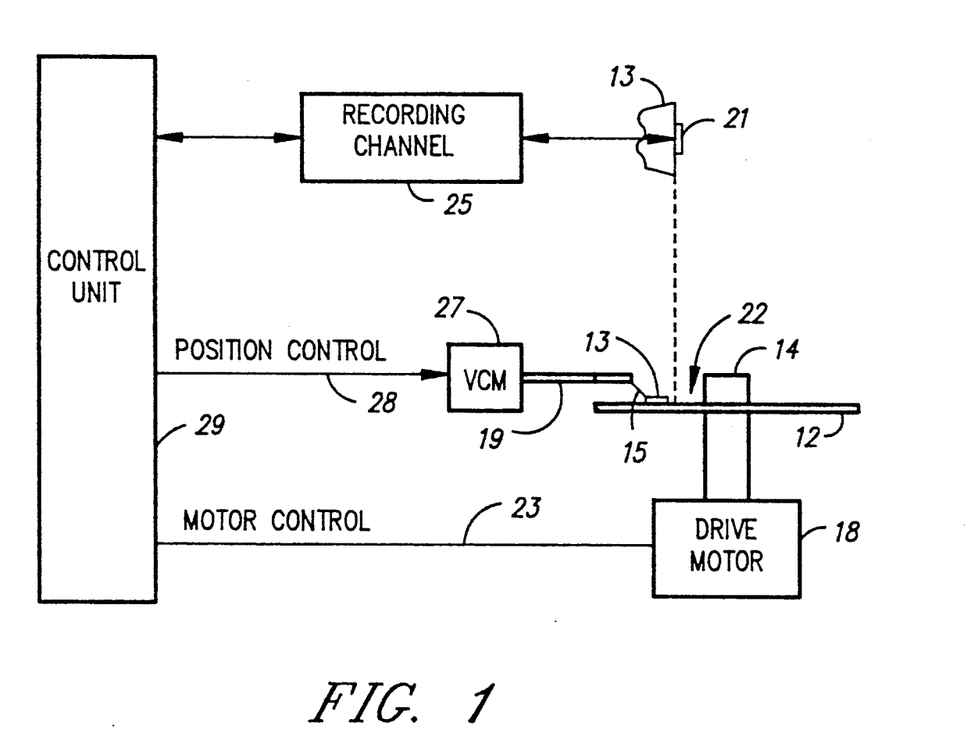
FIG. 1 is a simplified block diagram of a magnetic disk storage system embodying the present invention.

Referring now to FIG. 1, although the invention is described as embodied in a magnetic disk storage system as shown in FIG. 1, it will be apparent that the invention is also applicable to other magnetic recording systems such as a magnetic tape recording system, for example. At least one rotatable magnetic disk 12 is supported on a spindle 14 and rotated by a disk drive motor 18. The magnetic recording media on each disk is in the form of an annular pattern of concentric data tracks (not shown) on disk 12.

At least one slider 13 is positioned on the disk 12, each slider 13 supporting one or more magnetic read/write transducers 21, typically referred to as read/write heads. As the disks rotate, the sliders 13 are moved radially in and out over the disk surface 22 so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means as shown in FIG. 1 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 12 generates an air bearing between the slider 13 and the disk surface 22 which exerts an upward force on the slider. The air bearing thus counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
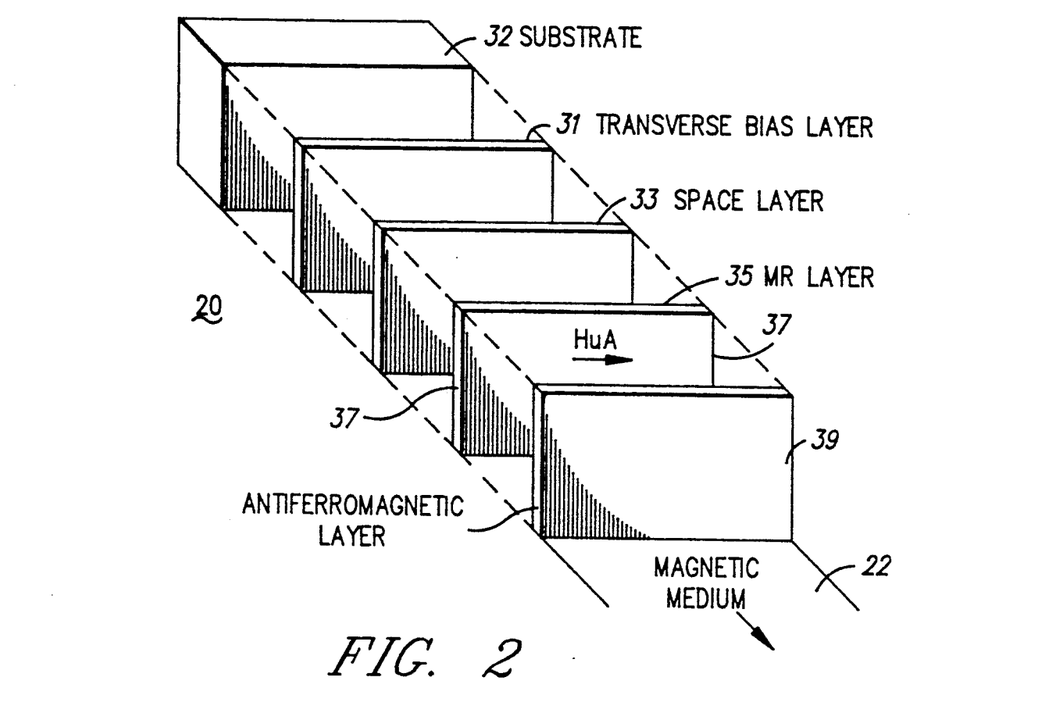
FIG. 2 is a schematic diagram illustrating the construction of a thin film MR sensor according to the present invention.
Figure 3:
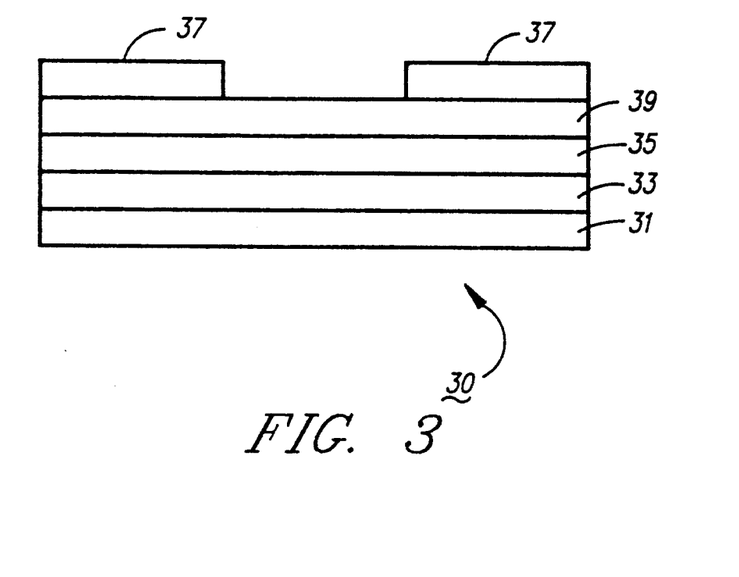
FIG. 3 is an end view of a preferred embodiment of the thin film MR sensor shown in FIG. 2.

Referring now also to FIGS. 2 and 3, a thin film MR sensor in accordance with the principles of the present invention comprises a substrate 32, a transverse bias layer 31, a spacer layer 33, an MR layer 35 and an antiferromagnetic layer 39. The MR layer 35 which is formed of a ferromagnetic material such as $Ni_{81}Fe_{19}$, for example, is attached to electrical conductors 37 and provides an output current. The output current from the MR layer 35 is a signal which enables a separate sensing circuit in the recording channel 25 to determine resistance changes in the MR layer. The resistance changes are a function of changes in the magnetic fields intercepted by the MR layer 35 from recorded data on the magnetic storage medium 22.

In order to assure that the MR layer 35 has uniaxial anisotropy the antiferromagnetic layer 39 is formed on MR layer 35. The antiferromagnetic layer 39 comprises an antiferromagnetic Mn alloy having an ordered CuAu-I type structure, i.e., a face-centered-tetragonal (fct) structure, preferably Ni-Mn. The antiferromagnetic layer 39 creates an interface exchange coupling with the ferromagnetic MR layer 35. This results in a longitudinal exchange bias field ($H_{UA}$) in the MR layer and creates a single magnetic domain in the MR layer 35. The existence of a single magnetic domain state in the MR layer is essential to suppress Barkhausen noise which is associated with MR materials which exhibit multiple magnetic domain states.

The transverse bias layer 31 provides a magnetic field oriented generally perpendicular to the medium 22 so as to slightly bias the magnetic field in the MR layer 35 in a direction non-parallel to the medium 22. This transverse bias field maintains the MR layer 35 in a linear response mode such that the current output is essentially a linear function of the resistance changes. The transverse bias layer 31 is separated from the MR layer 35 by a thin non-magnetic spacer layer, such as tantalum (Ta), for example. As is known in the art, the transverse bias field can be provided by shunt biasing, soft film biasing or permanent magnet biasing.

Figure 4:
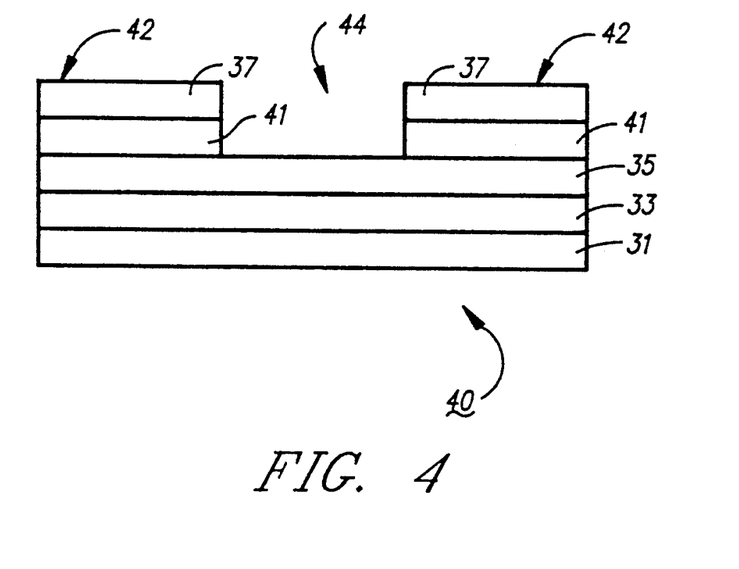
FIG. 4 is an end view of an alternate embodiment of the thin film MR sensor shown in FIG. 2.

Referring now also to FIG. 4, in a second embodiment of the MR sensor according to the present invention, to provide a patterned longitudinal bias field, the antiferromagnetic layer is formed in two separate end portions 41 deposited over the end regions 42 only of the MR layer 35. The antiferromagnetic layer portions 41 produce an $H_{UA}$ in the end regions only of the MR layer 35 to maintain the end regions 42 of the MR layer 35 in a single domain state. The spaced antiferromagnetic layer portions 41 define a central, detection region 44 of the MR layer 35 which is responsive to intercepted magnetic fields to provide a current signal as a function of the resistance changes in the central region 44 of the MR layer 35. The central region 44 of the MR layer 35 experiences no direct field from the longitudinal bias, but, through magnetostatic and exchange coupling along the MR layer, the single domain states of the end regions 42 induce a single domain state in the central region 44 of the MR layer. Transverse bias layer 31 provides a transverse bias field in the central portion 44 to maintain the central portion in a linear response mode.

A comprehensive description of prior art MR sensors similar to that shown in FIGS. 2 and 3 in which the antiferromagnetic layer 39 may be the gamma phase of Mn alloys and alternative embodiments are provided in the above-referenced U.S. Pat. No. 4,103,315. A prior art MR sensor having antiferromagnetic layer portions of Mn-Fe similar to the MR sensor shown in FIG. 4 is described in commonly assigned U.S. Pat. No. 4,663,685 to Tsang.

In order to understand the range of material and operational characteristics inherent in an MR sensor having an antiferromagnetic layer comprising fct Ni-Mn alloy, various thin film layered structures were prepared in a magnetron sputtering system in a uniform magnetic field of approximately 40 Oe. $Ni_{19}Fe_{81}$, $Ni_{50}Mn_{50}$, $Fe_{50}Mn_{50}$ and pure Ta targets of 200 mm in diameter were used to deposit multilayered Ta/Ni-Fe/Ni-Mn/Ta and Ta/Ni-Fe/Fe-Mn/Ta films on glass substrates. The system power density and system pressure were fixed at 3.2 w/cm$^2$ and $2 \times 10^{-7}$ Torr, respectively. Ta, Ni-Mn and Fe-Mn films of 22.0, 50.4 and 12.6 nm in thickness, respectively, were DC magnetron sputter-deposited with an argon (Ar) pressure of $3 \times 10^{-3}$ Torr and a palette rotation speed of 30 RPM. In addition to the same deposition parameters, an RF substrate bias of $-80$ volts (V) was used for the RF magnetron sputter-deposition of a 28.5 nm thick Ni-Fe film. Multilayered structures having Ni-Mn and Fe-Mn antiferromagnetic layers deposited both before and after the Ni-Fe MR layer were prepared. To provide improved corrosion resistant properties, DC magnetron cosputtering of Ni-Mn and pure Cr targets provided ternary Ni-Mn-Cr based alloys for the antiferromagnetic layer. The power density utilized with the pure Cr target was varied to obtain various Cr contents in the Ni-Mn-Cr films. All of the films with their easy magnetic axes aligned with a magnetic field of approximately 800 Oe were annealed at $3 \times 10^{-5}$ Torr in a hard bake vacuum furnace. Five annealing cycles were accomplished to simulate the photoresist hard bake process utilized during the fabrication of two-layer inductive heads. The sample structures prepared in accordance with process were then tested to measure the exchange bias field, $H_{UA}$, in the Ni-Fe MR layer at various parameters and the corrosion resistance of the antiferromagnetic layer. Electron microprobe analysis shows that the DC magnetron Ni-Mn film contains 46.7 at % Mn. Both X-ray diffraction patterns and transmission electron microscopy micrographs show a Mn alloy having a fct structure.

Referring now also to FIGS. 5, 6, 7 and 8, FIGS. 5 and 6 illustrate $H_{UA}$ for the various structures versus annealing cycles and ambient or operating temperature, respectively, for 50.4 nm thick Ni-Mn and 12.6 nm thick Fe-Mn films. The $H_{UA}$ of as-deposited Ni-Fe/Ni-Mn films is approximately 4.5 Oe, much lower than that of the as-deposited Ni-Fe/Fe-Mn films (approximately 38.4 Oe). However, the $H_{UA}$ of the Ni-Fe/Ni-Mn films sharply increase to 28.7 Oe after one annealing cycle and further increase to 113.0 Oe after five annealing cycles. While increase in the $H_{UA}$ is observed at higher annealing temperatures, sufficient $H_{UA}$ for practical applications is obtained by annealing at temperatures within the range typically utilized for the photoresist hard bake process, for example, at a temperature less than 260 degrees C. In contrast, the $H_{UA}$ of the Ni-Fe/Fe-Mn films only slightly increases to 40.4 Oe after five annealing cycles. When the deposition sequence of the layers is reversed, the Ni-Mn/Ni-Fe films exhibit an $H_{UA}$ of 32.4 Oe after five annealing cycles, while no exchange coupling is observed with the Fe-Mn/Ni-Fe films. Additionally, no change in the magnetic moment of Ni-Fe MR layer can be detected in all annealed exchange-coupled films.

Figure 6:
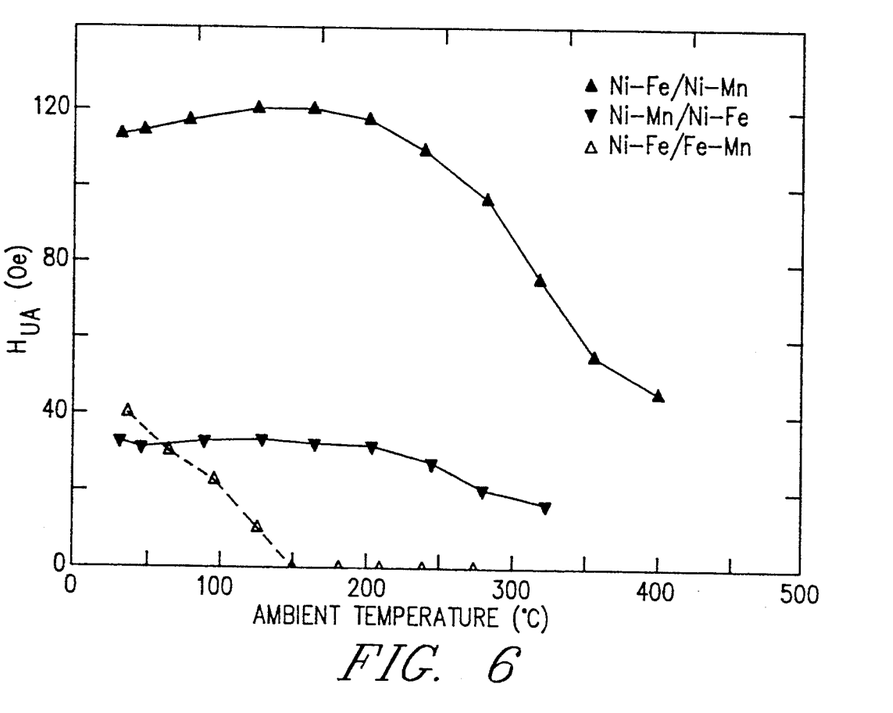
FIG. 6 is a graph illustrating the strength of the $H_{UA}$ as a function of ambient temperature for the MR sensor shown in FIG. 2.

The data of FIG. 6 show that the $H_{UA}$ of the Ni-Fe/Ni-Mn films increase slightly to 120.0 Oe as the ambient temperature increases up to 160 degree C., and then decreases to 42.9 Oe at 400 degrees C. In contrast, the $H_{UA}$ of the Ni-Fe/Fe-Mn films decrease linearly to 22.5 Oe at 90 degree C., and further to zero at 150 degrees C. When the layer deposition sequence is reversed, the $H_{UA}$ of the Ni-Mn/Ni-Fe films at 80 degrees C. is 32.2 Oe, lower than that of the Ni-Fe/Ni-Mn films but still higher than that of the Ni-Fe/Fe-Mn films.

Figure 5:
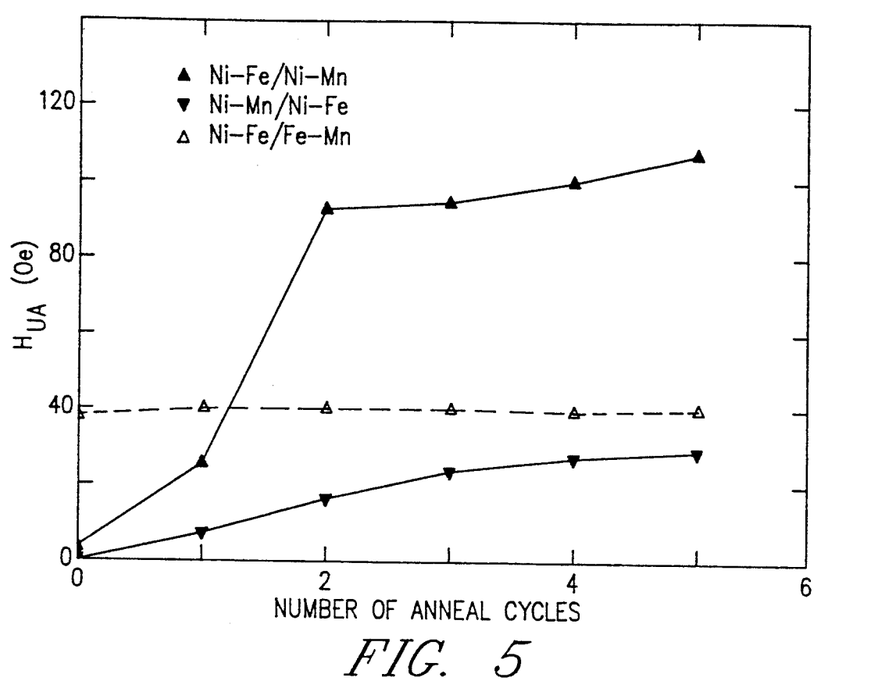
FIG. 5 is a graph illustrating the strength of the $H_{UA}$ as a function of the number of annealing cycles for the MR sensor shown in FIG. 2.

The data shown in FIGS. 5 and 6 indicate that a thin film Ni-Mn layer provides sufficient exchange coupling at an operating temperature of approximately 80 degrees C. to be utilized as the antiferromagnetic layer in an MR sensor. The results described above indicate that the Ni-Mn film deposited at a temperature of less than 100 degrees C. and so as to either overlay or underlay the Ni-Fe MR layer has a partially ordered structure, and ordering can be further achieved after annealing at a relatively low temperature below 260 degrees C.

Figure 7:
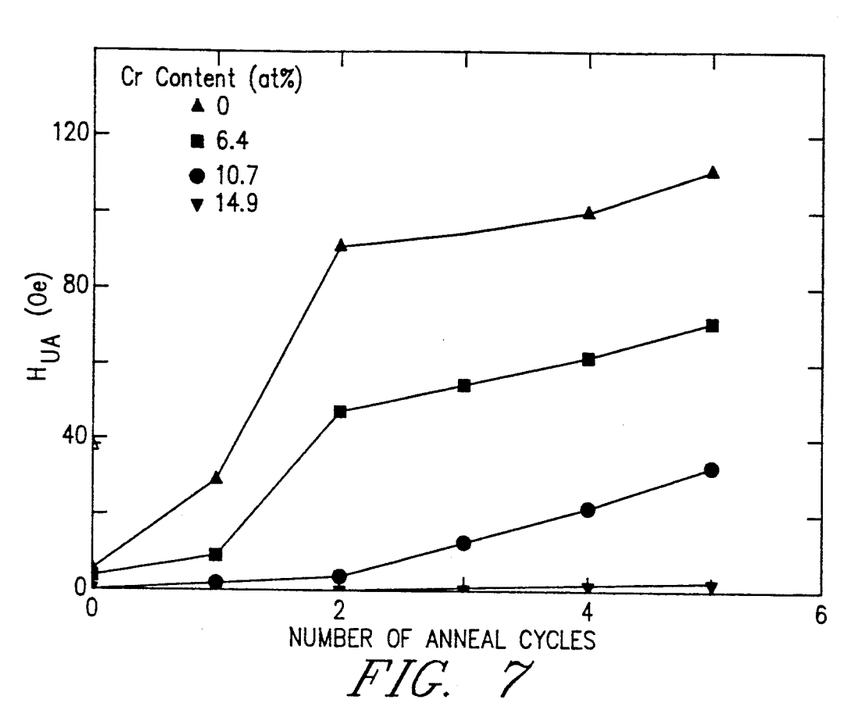
FIG. 7 is a graph illustrating the strength of the $H_{UA}$ as a function of the number of annealing cycles for an MR sensor as shown in FIG. 2 utilizing a Ni-Mn-Cr alloy antiferromagnetic layer.
Figure 8:
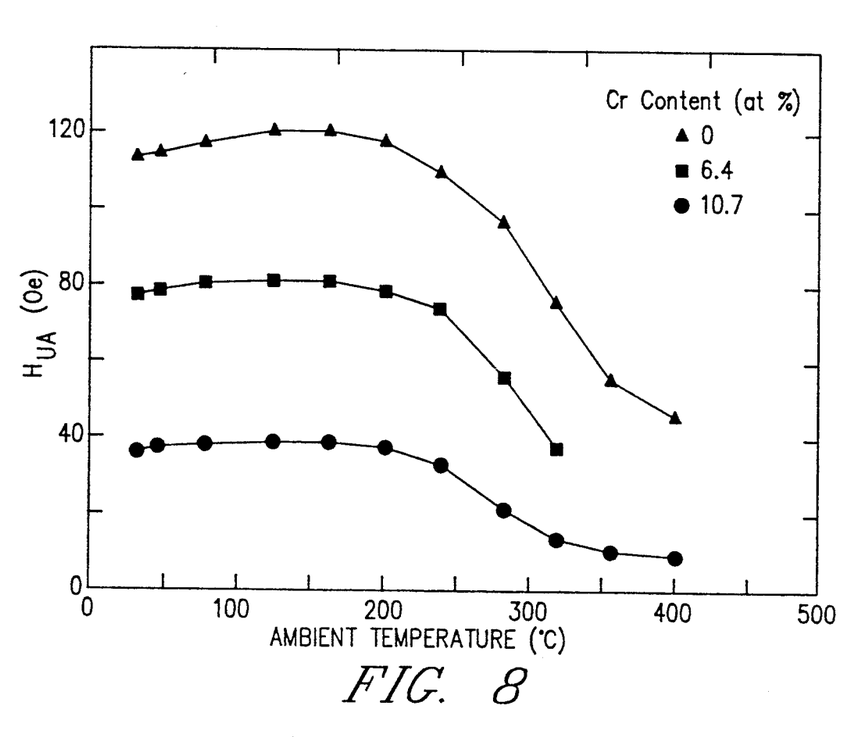
FIG. 8 is a graph illustrating the strength of the $H_{UA}$ as a function of ambient temperature for the MR sensor shown in FIG. 7.

FIGS. 7 and 8 illustrate $H_{UA}$ versus annealing cycles and ambient temperature, respectively, for 50.4 nm thick Ni-Mn and Ni-Mn-Cr films deposited on 28.5 nm thick Ni-Fe films. FIG. 7 shows that the $H_{UA}$ for Ni-Mn films containing 0, 6.4, 10.7 and 14.9 at % Cr after five annealing cycles are 113.0, 78.3, 36.1 and 1.2 Oe, respectively. FIG. 8 shows that the $H_{UA}$ of the Ni-Mn-Cr films monotonically decreases from 116.0 to 37.8 Oe as the Cr content increases from zero to 10.7 at %. The $H_{UA}$ of the annealed Ni-Mn-Cr films, in which the Cr content ranges from zero to 10.7 at %, is much higher and thermally more stable than that of the Fe-Mn films (as shown in FIGS. 5 and 6).

In order to determine the corrosion resistance of the various binary and ternary alloy films, potentiodynamic scans were carried out in a 0.1N sodium sulfate electrolyte (pH=7.0) for assessing atmospheric corrosion resistance. Corrosion behavior of Fe-Mn, Ni-Fe and Co-Pt-Cr films were also evaluated for comparison.

Figure 9:
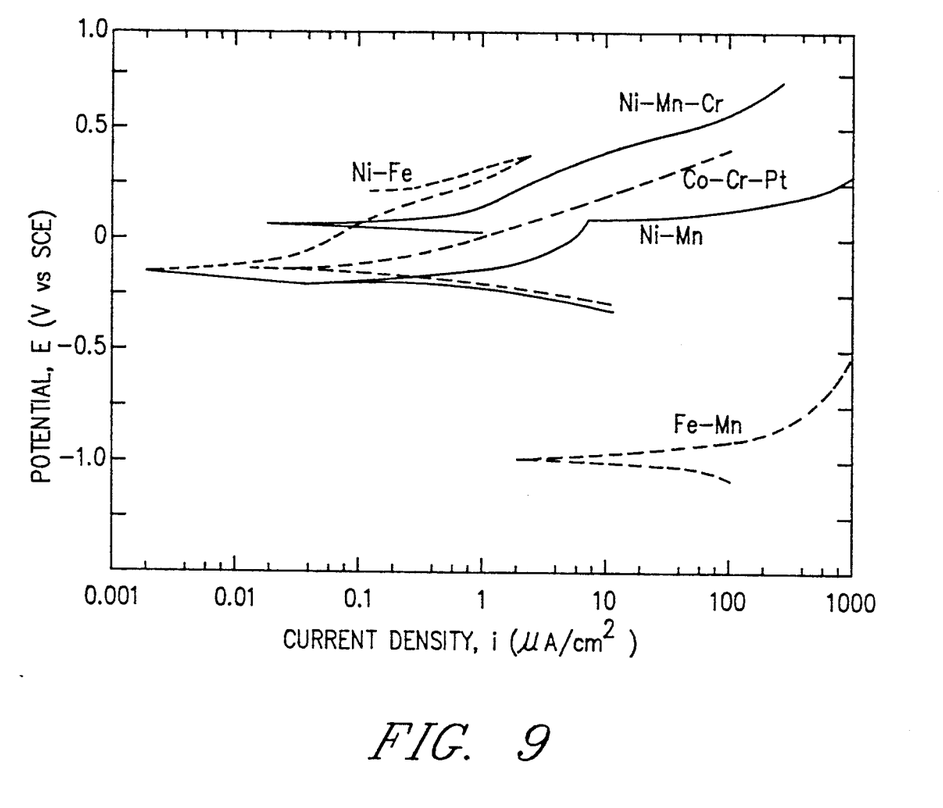
FIG. 9 is a graph illustrating the corrosion characteristics for antiferromagnetic layers in an aqueous solution for the MR sensor shown in FIG. 7.
Figure 10:
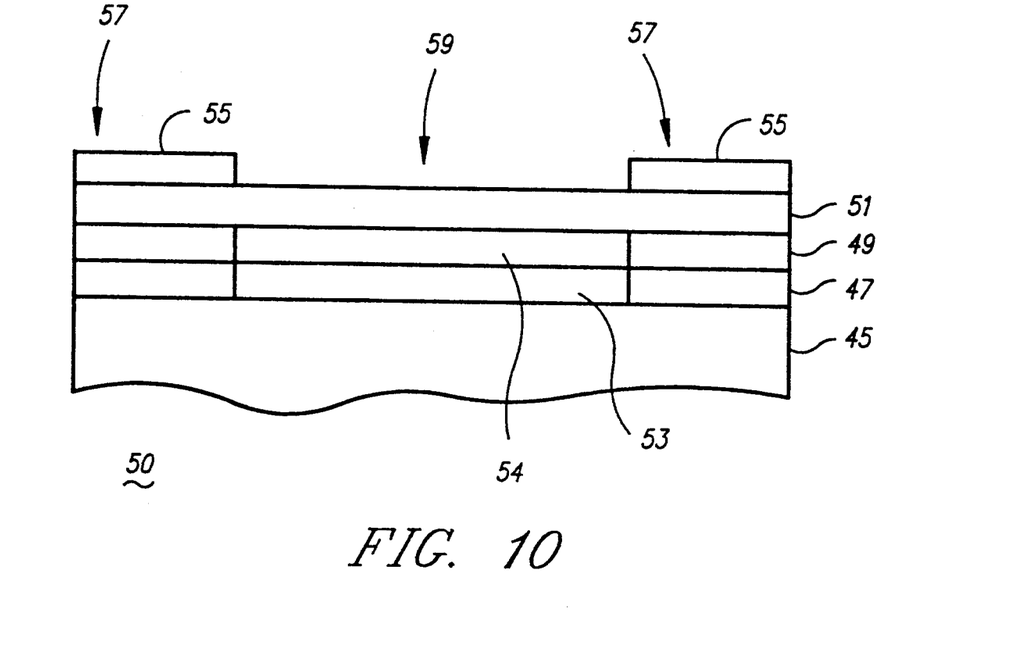
FIG. 10 is an end view of an alternate embodiment of an MR sensor according to the present invention.

Referring now also to FIGS. 9 and 10, FIG. 9 depicts potentiodynamic scans of as-deposited Ni-Mn, Ni-Mn-Cr, Fe-Mn, Ni-Fe and Co-Cr-Pt films in an 0.1N sodium sulfate electrolyte. Corrosion potentials ($E_c$), corrosion current densities at $E_c$ ($i_c$) and current densities at 100 mV ($i_{100}$) for the films are summarized in Table I below. Differences in corrosion behaviors of various Ni-Mn-Cr films exhibit $E_c$ much more positive than the Fe-Mn films, indicating a higher corrosion resistance. The Ni-Mn films exhibit an $i_c$ of 0.46 uA/cm$^2$, much lower than that of the Fe-Mn films (17.6 uA/cm$^2$). The $i_c$ monotonically decreases to 0.18 uA/cm$^2$ as the Cr content increases to 14.9 at %. The Ni-Mn and Ni-Mn-Cr films thus exhibit much improved corrosion characteristics compared to the Fe-Mn film and which are comparable to the corrosion characteristics for Ni-Fe and Co-Cr-Pt films. This result is further confirmed from the $i_{100}$ comparison of the various films, which provides the best method for atmospheric corrosion comparisons.

TABLE I

| SPECIMEN | $E_C$ (mV vs SCE) | $i_c$ (uA/cm$^2$) | $i_{100}$ (uA/cm$^2$) |
|---|---|---|---|
| Ni$_{53}$—Mn$_{47}$ | −160 | 0.46 | 6.0 |
| Ni$_{50}$—Mn$_{44}$—Cr$_6$ | +135 | 0.24 | 0.3 |
| Ni$_{47}$—Mn$_{42}$—Cr$_{11}$ | +135 | 0.21 | 0.2 |
| Ni$_{45}$—Mn$_{40}$—Cr$_{15}$ | +110 | 0.18 | 0.2 |
| Fe$_{50}$—Mn$_{50}$ | −1040 | 17.6 | 3000 |
| Ni$_{81}$—Fe$_{19}$ | −75 | 0.02 | 0.08 |
| Co$_{77}$—Pt$_{13}$—Cr$_{10}$ | −300 | 0.15 | 8.0 |

A significant advantage provided by the use of an Ni-Mn antiferromagnetic layer is the use of a lower annealing temperature during fabrication of the MR sensor. While the as-deposited Ni-Mn film exhibits substantially zero $H_{UA}$, after only two annealing cycles the Ni-Mn films are sufficiently ordered to provide the necessary exchange coupling. The $H_{UA}$ induced by annealed Ni-Mn films is much greater than that induced by the prior art Fe-Mn films. Since the Neel temperature of Ni-Mn is higher than the Curie temperature of Ni-Fe, the blocking temperature exhibited by the Ni-Mn/Ni-Fe films is close to the Curie temperature of the Ni-Fe film, which is much higher than the blocking temperature of Fe-Mn (about 220 degrees C.). It is expected that antiferromagnetic Mn-based alloy films having a stable ordered AuCu-I type, fct, structure over a range of compositions (for example, Ni-Mn, Ir-Mn, Pd-Mn, Pt-Mn and Rh-Mn alloys comprising 46-60, 45-63, 36-52, 33-60 and 50-65 at % Mn, respectively) will exhibit similar exchange coupling behaviors after annealing. Due to their lower Neel temperatures, their blocking temperatures should be between the blocking temperatures of Fe-Mn and Ni-Mn films. Furthermore, elements selected from the group including Ir, Pt, Rh, Ru, Ti and Zr, in addition to Cr, are expected to be suitable additives to form ternary Mn alloys having improved corrosion characteristics.

Referring now also to FIG. 10, a second embodiment of a thin film MR sensor 50 in accordance with the principles of the present invention comprises a substrate 45, a first spacer layer 47 and antiferromagnetic layer 49 underlying the end portions 57 only of an MR layer 51 and a transverse bias layer 53 separated from the MR layer 51 by a second space layer 54 underlying the central portion 59 of the MR layer 51. The MR layer 51 which is formed of a ferromagnetic material such as Ni$_{81}$Fe$_{19}$, for example, is attached to electrical conductors 55 and, in a similar manner as described above with reference to FIG. 2, provides an output current representative of the resistance changes in the central portion 59 of the MR layer. The antiferromagnetic layer 49 is of an antiferromagnetic Mn alloy having an ordered CuAu-I fct type structure, preferably fct Ni-Mn, while the first spacer layer 47, referred to as the underlayer, is of a suitable material, preferably zirconium (Zr), to achieve a high and thermally stable $H_{UA}$ in the MR layer 51. This inverted configuration, i.e., the antiferromagnetic layer underlying the MR layer, provides an MR sensor 50 wherein the conductor leads 55 are deposited directly on the MR layer in physical contact with the MR layer as compared to the MR sensor described hereinabove with reference to FIG. 4 wherein the conductor leads are deposited over the antiferromagnetic layer. The total thickness of the antiferromagnetic layer 49 and the underlayer 47 should be comparable to that of the transverse bias layer 53 and the second spacer layer 54. In current prior art MR sensors utilizing an Ni-Fe-Rh alloy for the transverse bias layer and Ta for the second spacer layer, for example, the thicknesses of the Ni-Fe-Rh, Ta and Ni-Fe films are about 21, 20 and 30 nm, respectively. Hence, the total thickness of the antiferromagnetic film and the underlayer should be about 41 nm for current MR sensors, for example.

Referring now to FIGS. 11-14, in order to provide an underlying antiferromagnetic layer having the required exchange coupling requirements and improved corrosion resistant characteristics when compared to Fe-Mn antiferromagnetic films, various multilayered Al$_2$O$_3$/X-/Ni-Mn/Ni-Fe/Al$_2$O$_3$ films, where X is Au, Cr, Cu, Pd, Rh, Ru, Ta, W or Zr, were deposited on glass substrates in the presence of a magnetic field in a magnetron sputtering system under similar conditions as described hereinabove with reference to FIGS. 5-10. The films with the easy axis of the Ni-Fe film aligned with a magnetic field of about 800 Oe were annealed in a vacuum furnace with a base pressure of 3×10$^{-5}$ Torr. In each annealing cycle, the temperature was increased to approximately 240 degrees C. over a set time period and maintained at 240–260 degrees C. over a set time period and then decreased. The annealing process utilized simulated that required for the hard bake of photoresist in the fabrication process of typical MR read/inductive write sensors. The as-deposited antiferromagnetic films with underlayers of various materials exhibit $H_{UA}$ values of less than 1 Oe. However, after annealing, the $H_{UA}$ values of Ni-Mn(25.2 nm)/Ni-Fe(28.5 nm) films with Al$_2$O$_3$, Au, Cr, Cu, Pd, Rh, Ru, Ta, W and Zr underlayers achieve 21.6, 13.7, 18.7, 40.6, 12.6, 29.2, 34.9, 32.4, 18.4, 165.9 Oe, respectively. Only the films with the Zr underlayer exhibit a substantially high $H_{UA}$.

In general, the closest-packed crystallographic plane in the as-deposited film lies parallel to the amorphous substrate/film interface. The nearest interatomic distance in this plane thus determines the crystallographic structure and texture of the subsequently deposited film. The Zr underlayer exhibits a hexagonal-close-packed (hcp) structure (a=0.323 nm, c=0.515 nm and c/a=1.594). Its nearest interatomic distance (0.323 nm) is much larger than that of the other underlayer materials tested (0.288, 0.250, 0.256, 0.275, 0.269, 0.265, 0.286 and 0.274 nm for Au, Cr, Cu, Pd, Rh, Ru, Ta and W, respectively). This largest interatomic distance appears to play a crucial role in the improvement of exchange coupling after annealing. Because of the similarity of its crystallographic structure to that of the Zr underlayer, a Y underlayer which also exhibits an hcp structure (a=0.365 nm, c=0.573 nm and c/a=1.570) has been found to also provide strong exchange coupling.

Figure 11:
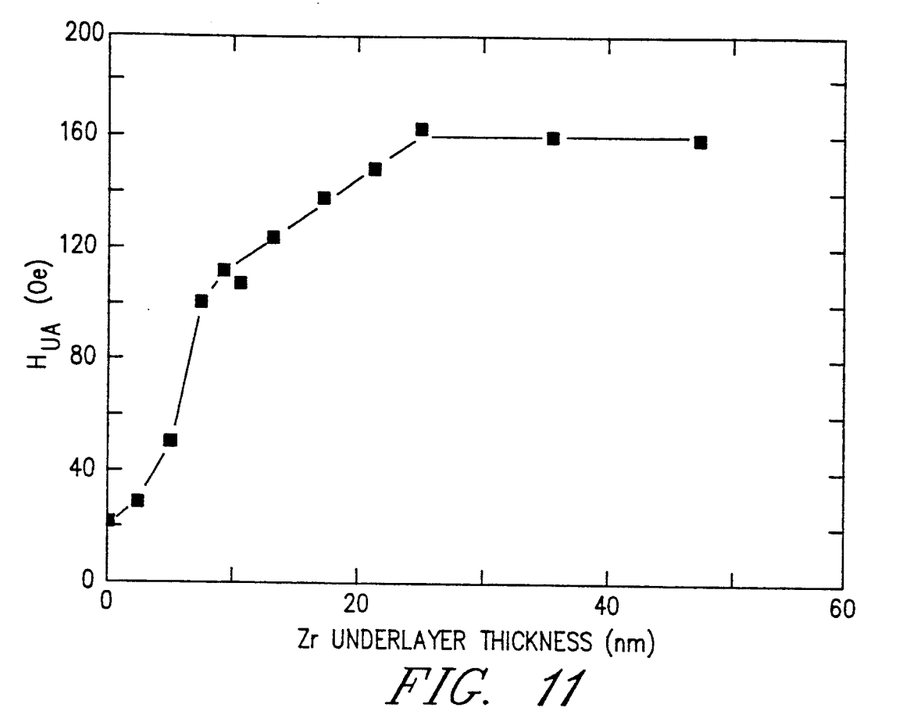
FIG. 11 is a graph illustrating the strength of the $H_{UA}$ as a function of underlayer thickness for the MR sensor shown in FIG. 10.
Figure 12:
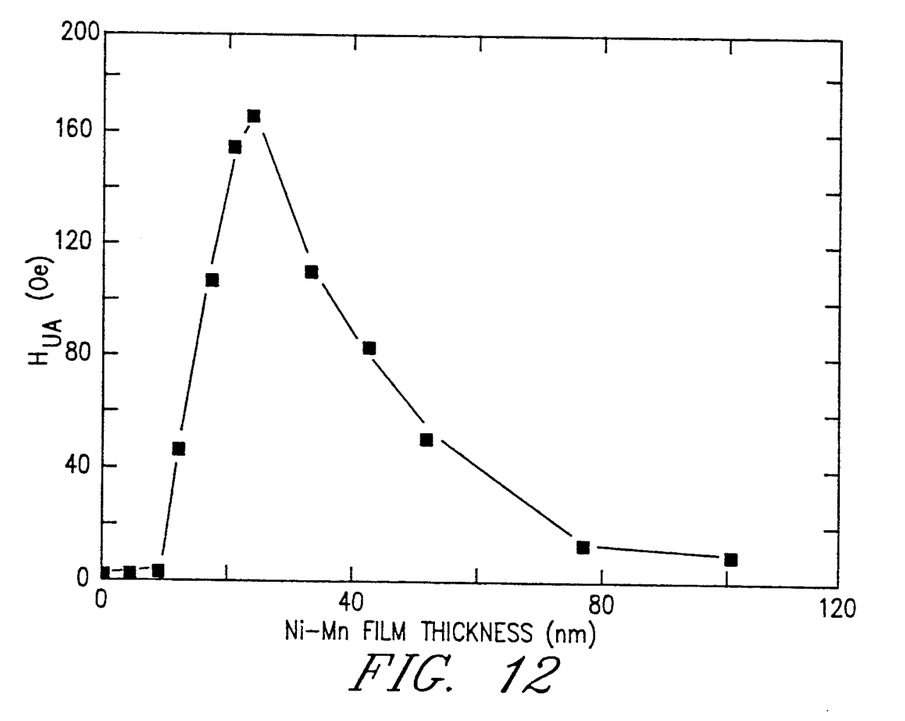
FIG. 12 is a graph illustrating the strength of the $H_{UA}$ as a function of the antiferromagnetic layer thickness for the MR sensor shown in FIG. 10.
Figure 13:
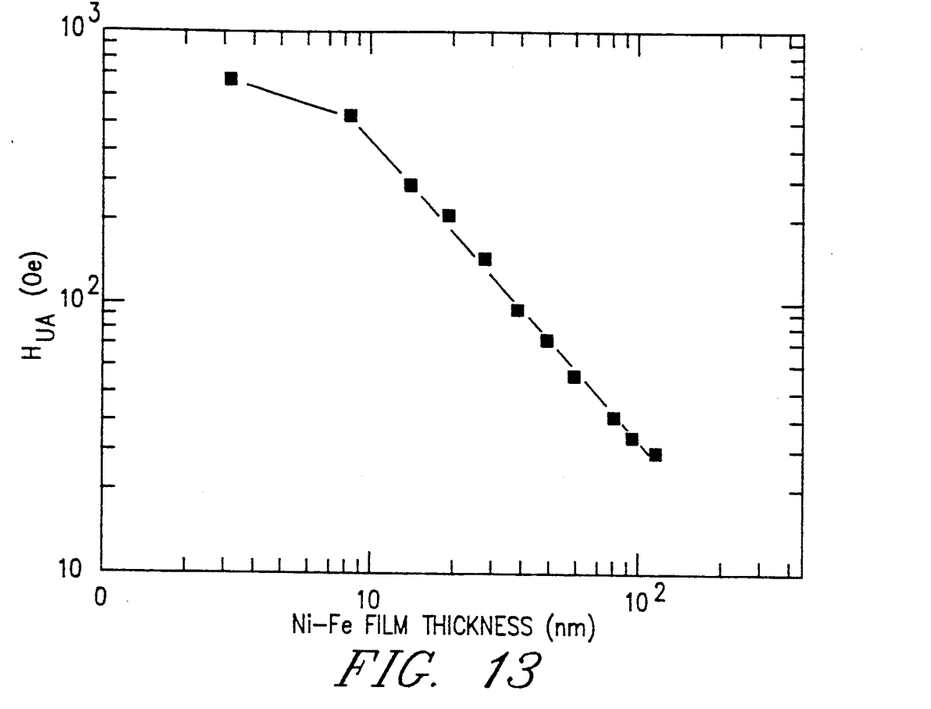
FIG. 13 is a graph illustrating the strength of the $H_{UA}$ as a function of the MR layer thickness for the MR sensor shown in FIG. 10.

The strength of the $H_{UA}$ produced in the MR layer shows a strong dependence on the thickness of all three deposited layers, the Zr underlayer, the Ni-Mn antiferromagnetic layer and the Ni-Fe ferromagnetic MR layer. FIG. 11 shows the $H_{UA}$ versus the Zr underlayer thickness ($t_Z$) for annealed Zr/Ni-Mn(25.2 nm)/Ni-Fe(28.5 nm) films. The $H_{UA}$ increases from 21.6 to 165.9 Oe as the $t_Z$ increases from 0 to 24.3 nm, and then remains substantially unchanged as the $t_Z$ is further increased. FIG. 12 shows the $H_{UA}$ versus the Ni-Mn thickness ($t_{NM}$) for annealed Zr(24.3 nm)/Ni-Mn/Ni-Fe(28.5 nm) films. The exhibited $H_{UA}$ is less than 1 Oe for $t_{NM}$ of thickness up to 8.4 nm. In contrast, the $H_{UA}$ values increase to 50.5, 106.2, 155.9 and 165.9 Oe for $t_{NM}$ of 12.6, 16.8, 21.0 and 25.2 nm, respectively. The $H_{UA}$ sharply decreases as $t_{NM}$ is further increased. FIG. 13 shows the $H_{UA}$ versus the Ni-Fe thickness ($t_{NF}$) for Zr(24.3 nm)/Ni-Mn(25.2 nm)/Ni-Fe films. With the exception of very thin films, less than approximately 2.5 nm, the $H_{UA}$ varies roughly linearly with 1/$t_{NF}$. The $H_{UA}$ increases from 30.3 to 668.0 Oe as the $t_{NF}$ is decreased from 118.5 to 2.5 nm.

The 1/$t_{NF}$ characteristic for $H_{UA}$ as a function of the MR layer thickness indicates that Zr(24.3 nm)/Ni-Mn(25.2 nm) films deposited under 30 and 15 nm thick Ni-Fe MR layers achieve $H_{UA}$ values as high as 157.6 and 315.2 Oe, respectively. Consistent with the requirement that the total thickness of the antiferromagnetic layer and its underlayer be comparable to that of the transverse layer and its spacer, annealed Zr(20.2 nm)/Ni-Mn(21.0 nm)/Ni-Fe(30.0 nm) and Zr(6.1 nm)/Ni-Mn(21.0)/Ni-Fe(15.0 nm) films, for example, provide an $H_{UA}$ as high as 111.7 and 249.2 Oe, respectively. While a $t_Z$ of only 6.1 nm provides a relatively high $H_{UA}$, a further decrease in $t_{NM}$ results in a sharp decrease in $H_{UA}$. For example, annealed Zr(6.1 nm)/Ni-Mn(12.6 nm)/Ni-Fe(15.0 nm) films exhibit an $H_{UA}$ of 52.1 Oe, which, while substantially lower, is sufficiently high enough for longitudinal biasing.

Figure 14:
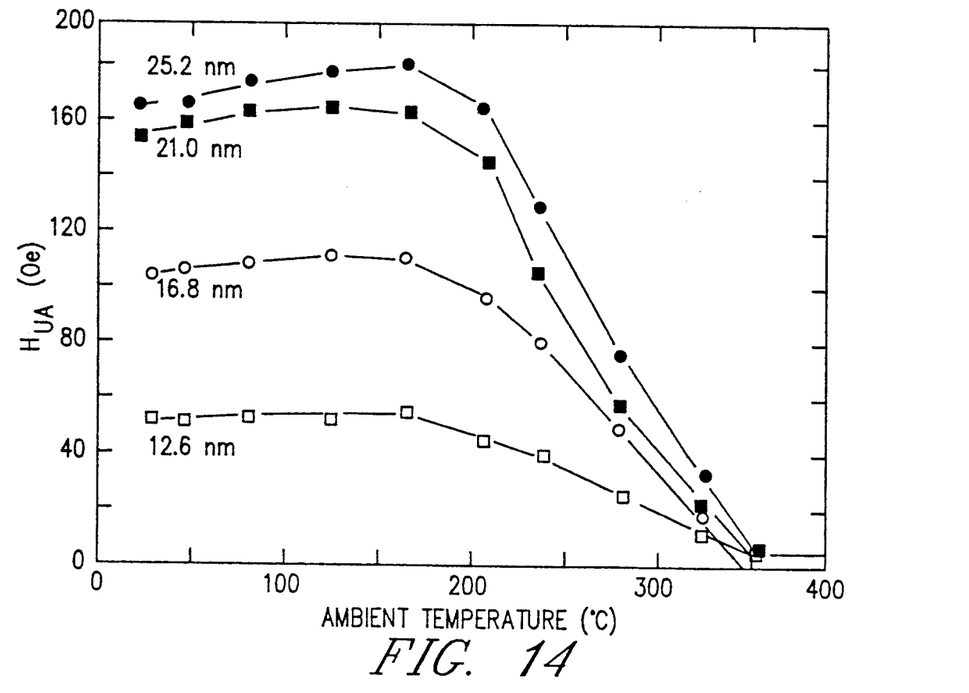
FIG. 14 is a graph illustrating the strength of the $H_{UA}$ as a function of the ambient temperature for antiferromagnetic layers of various thickness for the MR sensor shown in FIG. 10.

FIG. 14 shows the $H_{UA}$ versus ambient temperature for annealed Zr(24.3 nm)/Ni-Mn/Ni-Fe(28.5 nm) films for selected $t_{NM}$ of the antiferromagnetic layer. The $H_{UA}$ for the 25.2 nm thick Ni-Mn film further increases to 182.2 Oe as the ambient temperature increases to 160 degrees C and then monotonically decreases to 1.7 Oe at 400 degrees C. For Ni-Mn films as thin as 12.6 nm, the $H_{UA}$ at 160 degrees C. is still as high as 55.1 Oe. Thus, as can be seen from the data shown in FIG. 14, use of an Ni-Mn antiferromagnetic layer with an underlayer of Zr provides the required thermal stability at and above the typical operating temperature of 80 degrees C. for an MR sensor.

Although both Ta and Zr underlayers have been used in the first and second embodiments of the present invention as described above to provide high exchange coupled bias fields, it is to be noted that bilayered Ni-Fe/Ni-Mn and Ni-Mn/Ni-Fe films without underlayers exhibit exchange fields high enough to provide sufficient longitudinal biasing. In particular, an increase in Mn content in the antiferromagnetic Ni-Mn film significantly increases the exchange coupled bias fields in the absence of any underlayer. For example, when the Mn content is increased to 54.4 at %, annealed Ni-Fe(28.5 nm)/Ni-Mn(31.7 nm) and Ni-Mn(31.7 nm)/Ni-Fe(28.5 nm) films without underlayers exhibit exchange coupled bias fields as great as 79.0 and 80.2 Oe, respectively. In addition, the Ni$_{45.6}$-Mn$_{54.4}$ films continue to exhibit good corrosion characteristics.

While the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

We claim:

1. A magnetoresistive read sensor of the type having a layer of antiferromagnetic material in direct contact with a layer of magnetoresistive ferromagnetic material for inducing a longitudinal bias field in the ferromagnetic layer wherein said antiferromagnetic layer comprises an alloy of manganese (Mn), at least a portion of said Mn alloy layer having a face-centered-tetragonal (fct) structure.

2. A magnetoresistive read sensor as in claim 1 wherein said Mn alloy comprises a nickel-manganese (Ni-Mn) alloy having a predetermined composition.

3. A magnetoresistive read sensor as in claim 2 wherein said Ni-Mn alloy comprises a composition within a range of about 46 to about 60 atomic percent Mn.

4. A magnetoresistive read sensor as in claim 1 wherein said magnetoresistive ferromagnetic layer is an alloy comprising nickel and iron.

5. A magnetoresistive read sensor as in claim 1 wherein said Mn alloy comprises a ternary alloy of nickel, manganese and a selected corrosion-resistant material.

6. A magnetoresistive read sensor as in claim 5 wherein said selected corrosion-resistant material is selected from the group consisting of iridium, platinum, rhodium, ruthenium, titanium and zirconium.

7. A magnetoresistive read sensor as in claim 5 wherein said selected corrosion-resistant material is chromium (Cr).

8. A magnetoresistive read sensor as in claim 7 wherein said ternary alloy comprises Cr in the range of from 0 to 11 atomic percent.

9. A magnetoresistive read sensor as in claim 1 wherein at least a portion of said antiferromagnetic layer comprises Mn being in a theta phase.

10. A magnetoresistive read sensor as in claim 1 wherein said Mn alloy is selected from the group consisting of nickel (Ni), iridium (Ir), palladium (Pd), platinum (Pt) and rhodium (Rh) alloys of Mn.

11. A magnetoresistive read sensor as in claim 10 wherein said Mn alloy is selected from the group consisting of Ni-Mn, Ir-Mn, Pd-Mn, Pt-Mn and Rh-Mn having a composition within the range of 46 to 60, 45 to 63, 36 to 52, 33 to 60 and 50 to 65, respectively, atomic percent Mn.

* * * * *